US007604537B2

(12) United States Patent
Amaitis et al.

(10) Patent No.: US 7,604,537 B2
(45) **Date of Patent: *Oct. 20, 2009**

(54) SYSTEM AND METHOD FOR WAGERING BASED ON FINANCIAL MARKET INDICATORS

(75) Inventors: Lee M. Amaitis, London (GB); Joseph M. Asher, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/841,049

(22) Filed: Aug. 20, 2007

(65) Prior Publication Data

US 2008/0032778 A1 Feb. 7, 2008

Related U.S. Application Data

(62) Division of application No. 10/836,077, filed on Apr. 29, 2004.

(51) Int. Cl.
*A63B 71/00* (2006.01)
*A63F 3/06* (2006.01)
*A63F 13/12* (2006.01)

(52) U.S. Cl. ............................ 463/17; 463/16; 463/19; 463/20

(58) Field of Classification Search ............ 463/16–20, 463/22
See application file for complete search history.

(56) References Cited

U.S. PATENT DOCUMENTS

| | | | |
|---|---|---|---|
| 4,248,458 | A | 2/1981 | Brody |
| 4,540,174 | A | 9/1985 | Coppock |
| 4,569,526 | A | 2/1986 | Hamilton |
| 4,666,160 | A | 5/1987 | Hamilton |
| 4,695,053 | A | 9/1987 | Vazquez, Jr. et al. |
| 4,856,788 | A | 8/1989 | Fischel |
| 4,874,177 | A | 10/1989 | Girardin |
| 4,883,636 | A | 11/1989 | Fantle, Jr. |
| 4,935,748 | A | 6/1990 | Schmidt et al. |

(Continued)

FOREIGN PATENT DOCUMENTS

| | | |
|---|---|---|
| EP | 1139245 | 3/2000 |

(Continued)

OTHER PUBLICATIONS binarybet.com, "Welcome to binarybet.com," © binarybet.com website, printed Feb. 2, 2004 (1 page).

(Continued)

*Primary Examiner*—Peter DungBa Vo
*Assistant Examiner*—Frank M Leiva
(74) *Attorney, Agent, or Firm*—Mark A. Miller

(57) ABSTRACT

A method for wagering comprises receiving a bet regarding a spin of the reels of a slot machine. The method continues by determining a first value for a first reel of the slot machine based at least in part upon the value of a digit of a first financial market indicator. The method proceeds by determining a second value for a second reel of the slot machine, and by determining a third value for a third reel of the slot machine. The method concludes by determining the outcome of the bet based at least in part upon the first value, the second value, and the third value.

20 Claims, 2 Drawing Sheets

U.S. PATENT DOCUMENTS

| | | | | |
|---|---|---|---|---|
| 4,962,950 | A | 10/1990 | Champion | |
| 5,518,239 | A | 5/1996 | Johnston | |
| 5,524,888 | A | 6/1996 | Heidel | |
| 5,586,937 | A | 12/1996 | Menashe | |
| 5,683,090 | A | 11/1997 | Zeile et al. | |
| 5,713,793 | A | 2/1998 | Holte | |
| 5,743,525 | A | 4/1998 | Haddad | |
| 5,749,785 | A | 5/1998 | Rossides | |
| 5,782,470 | A | 7/1998 | Langan | |
| 5,851,010 | A | 12/1998 | Feinberg | |
| 5,888,136 | A | 3/1999 | Herbert | |
| 6,001,016 | A | 12/1999 | Walker et al. | |
| 6,024,641 | A * | 2/2000 | Sarno | 463/17 |
| 6,026,383 | A | 2/2000 | Ausubel | |
| 6,038,554 | A | 3/2000 | Vig | |
| 6,102,797 | A | 8/2000 | Kail | |
| 6,110,042 | A | 8/2000 | Walker et al. | |
| 6,113,492 | A | 9/2000 | Walker et al. | |
| 6,120,376 | A | 9/2000 | Cherry | |
| 6,126,543 | A | 10/2000 | Friedman | |
| 6,135,881 | A | 10/2000 | Abbott et al. | |
| 6,152,822 | A | 11/2000 | Herbert | |
| 6,157,918 | A | 12/2000 | Shepherd | |
| 6,193,605 | B1 | 2/2001 | Libby et al. | |
| 6,296,569 | B1 | 10/2001 | Congello, Jr. | |
| 6,309,307 | B1 * | 10/2001 | Krause et al. | 473/274 |
| 6,321,212 | B1 | 11/2001 | Lange | |
| 6,325,721 | B1 | 12/2001 | Miyamoto et al. | |
| 6,331,148 | B1 | 12/2001 | Krause et al. | |
| 6,343,988 | B1 | 2/2002 | Walker et al. | |
| 6,358,150 | B1 | 3/2002 | Mir et al. | |
| 6,394,899 | B1 | 5/2002 | Walker | |
| 6,421,653 | B1 | 7/2002 | May | 705/37 |
| 6,450,887 | B1 | 9/2002 | Mir et al. | |
| 6,527,270 | B2 | 3/2003 | Maksymec et al. | |
| 6,558,255 | B2 | 5/2003 | Walker et al. | |
| 6,616,529 | B1 | 9/2003 | Qian et al. | |
| 6,624,641 | B1 * | 9/2003 | Krampitz et al. | 324/691 |
| 6,656,042 | B2 | 12/2003 | Reiss et al. | |
| 6,663,107 | B2 | 12/2003 | Fisher et al. | |
| 6,688,978 | B1 | 2/2004 | Herman | |
| 6,709,330 | B1 | 3/2004 | Klein et al. | |
| 6,869,360 | B2 * | 3/2005 | Marks et al. | 463/25 |
| 6,910,965 | B2 | 6/2005 | Downes | |
| 7,040,982 | B1 | 5/2006 | Jarvis et al. | |
| 7,094,151 | B2 | 8/2006 | Downes | |
| 7,160,189 | B2 | 1/2007 | Walker et al. | |
| 7,206,762 | B2 | 4/2007 | Sireau | 705/37 |
| 7,302,412 | B1 | 11/2007 | Speck | 705/37 |
| 7,458,891 | B2 | 12/2008 | Asher et al. | |
| 2001/0032169 | A1 | 10/2001 | Sireau | |
| 2001/0039209 | A1 | 11/2001 | DeWeese et al. | |
| 2002/0032644 | A1 | 3/2002 | Corby et al. | 705/37 |
| 2002/0073021 | A1 | 6/2002 | Ginsberg et al. | |
| 2002/0087447 | A1 | 7/2002 | McDonald et al. | |
| 2002/0115488 | A1 | 8/2002 | Berry et al. | |
| 2002/0147047 | A1 | 10/2002 | Letovsky et al. | |
| 2002/0151340 | A1 | 10/2002 | Guinn et al. | |
| 2002/0151363 | A1 | 10/2002 | Letovsky et al. | |
| 2002/0198044 | A1 | 12/2002 | Walker et al. | |
| 2002/0198052 | A1 | 12/2002 | Soltys et al. | |
| 2003/0046218 | A1 | 3/2003 | Albanese et al. | |
| 2003/0054875 | A1 | 3/2003 | Marks et al. | |
| 2003/0109300 | A1 | 6/2003 | Walker et al. | |
| 2003/0157976 | A1 | 8/2003 | Simon et al. | |
| 2003/0178775 | A1 | 9/2003 | Fisher et al. | |
| 2003/0190941 | A1 | 10/2003 | Byrne | |
| 2003/0195029 | A1 | 10/2003 | Frohm et al. | |
| 2003/0195841 | A1 | 10/2003 | Ginsberg et al. | |
| 2003/0199315 | A1 | 10/2003 | Downes | |
| 2003/0216170 | A1 | 11/2003 | Walker et al. | |
| 2003/0220134 | A1 | 11/2003 | Walker et al. | |
| 2003/0224847 | A1 | 12/2003 | Jaimet | |
| 2004/0029627 | A1 | 2/2004 | Hannan et al. | |
| 2004/0048656 | A1 | 3/2004 | Krynicky | |
| 2004/0166918 | A1 | 8/2004 | Walker et al. | |
| 2004/0166942 | A1 * | 8/2004 | Muir | 463/43 |
| 2004/0176159 | A1 | 9/2004 | Walker et al. | |
| 2004/0176994 | A1 | 9/2004 | Fine et al. | |
| 2004/0204229 | A1 | 10/2004 | Walker et al. | |
| 2004/0204232 | A1 | 10/2004 | Asher et al. | |
| 2004/0210507 | A1 | 10/2004 | Asher et al. | |
| 2004/0214629 | A1 | 10/2004 | Walker et al. | |
| 2004/0224770 | A1 * | 11/2004 | Wolf et al. | 463/42 |
| 2005/0026670 | A1 | 2/2005 | Lardie | |
| 2005/0027643 | A1 | 2/2005 | Amaitis et al. | |
| 2005/0043078 | A1 | 2/2005 | Sundstrom | |
| 2005/0059467 | A1 | 3/2005 | Saffari et al. | |
| 2005/0085288 | A1 | 4/2005 | Schugar et al. | |
| 2005/0119962 | A1 | 6/2005 | Bowen et al. | |
| 2005/0197938 | A1 | 9/2005 | Davie et al. | |
| 2005/0197939 | A1 | 9/2005 | Davie et al. | |
| 2005/0197948 | A1 | 9/2005 | Davie et al. | |
| 2005/0208996 | A1 | 9/2005 | Friedman | |
| 2005/0245306 | A1 | 11/2005 | Asher et al. | |
| 2005/0245308 | A1 * | 11/2005 | Amaitis et al. | 463/20 |
| 2005/0245310 | A1 * | 11/2005 | Amaitis et al. | 463/20 |
| 2006/0105839 | A1 | 5/2006 | Graeve et al. | |
| 2006/0105840 | A1 | 5/2006 | Graeve | |
| 2007/0111777 | A1 | 5/2007 | Amaitis et al. | 463/16 |
| 2007/0117624 | A1 | 5/2007 | Amaitis et al. | 463/30 |
| 2007/0123336 | A1 | 5/2007 | Amaitis et al. | 463/16 |
| 2007/0129138 | A1 | 6/2007 | Amaitis et al. | 463/25 |
| 2007/0184888 | A1 | 8/2007 | Asher et al. | |
| 2007/0184892 | A1 | 8/2007 | Asher et al. | |
| 2007/0187889 | A1 | 8/2007 | Asher et al. | |
| 2007/0191085 | A1 | 8/2007 | Asher et al. | |
| 2008/0032778 | A1 | 2/2008 | Amaitis et al. | |

FOREIGN PATENT DOCUMENTS

| | | |
|---|---|---|
| EP | 1234606 | 8/2002 |
| GB | 1574447 | 9/1980 |
| GB | 2180675 | 4/1987 |
| GB | 2299425 | 10/1996 |
| WO | WO 98/04991 | 2/1998 |
| WO | WO99/60498 | 11/1999 |
| WO | WO 00/79442 | 12/2000 |
| WO | WO 01/77964 | 10/2001 |
| WO | WO 01/86532 | 11/2001 |
| WO | WO 2004/079671 | 9/2004 |
| WO | WO 2005/065065 | 7/2005 |

OTHER PUBLICATIONS binarybet.com, "What is a Binary Bet?," © binarybet.com website, printed Feb. 2, 2004 (1 page).

binarybet.com, "Frequently Asked Questions," © binarybet.com website, printed Feb. 2, 2004 (1 page).

Notification of Transmittal of the International Search Report and the Written Opinion of the International Searching Authority or the Declaration, for International Application No. PCT/US2005/006853, May 10, 2005 (13 pages).

"NTRA All-Star Jockey Championship Special Wagers," date unknown, (3 pages).

"Wagering Information; Straight or Basic Wagers," Lone Star Park at Grand Prairie: Player's Guide, http://www.lonestarpark.com/bet_info.asp, printed on Jul. 8, 2003 (3 pages).

"Wagering Information; Straight or Basic Wagers," NTRA.com, http://www.ntra.com/news.asp?type=playthehorses&id=4799, printed on Jul. 8, 2003 (3 pages).

"Glossary of Terms," NTRA.com, http://www.ntra.com/news.asp?type=playthehorses&id=4797 (3 pages).

"The Basics of Horseplay," NTRA.com, http://www.ntra.comlnews.asp?type=playthehorses&id=4795 (2 pages).

U.S. Appl. No. 10/654,280, filed Sep. 3, 2003, Asher, et al.
U.S. Appl. No. 10/794,666, filed Mar. 5, 2004, Davie, et al.
U.S. Appl. No. 10/794,668, filed Mar. 5, 2004, Davie, et al.
U.S. Appl. No. 10/795,163, filed Mar. 5, 2004, Davie, et al.
U.S. Appl. No. 10/836,077, filed Apr. 29, 2004, Amaitis, et al.
"Bet With the People Who Know Racing," Daily Racing Form, Jul. 24, 2001 (15 pages).
"Quote of the Day; Bet of the Day," London Times, Jul. 30, 2003 (1 page).
TradeSports Trading & Betting Exchange, Best Lines & Bonuses, "What is Tradesports?," www.tradesports.com, Apr. 27, 2004 (2 pages).
Notification of Transmittal of the International Search Report and the Written Opinion of the International Searching Authority or the Declaration, for International Application No. PCT/US2005/46927, Jun. 19, 2006 (9 pages).
U.S. Appl. No. 10/836,999, filed Apr. 29, 2004, Amaitis, et al.
U.S. Appl. No. 11/018,978, filed Dec. 21, 2004, Asher, et al.
U.S. Appl. No. 11/745,573, filed May 8, 2007, Asher, et al.
U.S. Appl. No. 11/745,646, filed May 8, 2007, Asher, et al.
U.S. Appl. No. 11/963,158, filed Dec. 21, 2007, Amaitis, et al.
U.S. Appl. No. 11/963,088, filed Dec. 21, 2007, Amaitis, et al.
The Patent Office Search Report from International Application No. GB 0320232.2, Dec. 17, 2003 (6 pgs).
Notification of Transmittal of the International Search Report and the Written Opinion of the International Searching Authority or the Declaration, for International Application No. PCT/US04/10028, Jun. 23, 2006 (6 pages).
Ozgit, A.; Performance Based Sports Derivatives: A New Instrument; Chapter 3; pp. 83-121 (date unknown).
Sauer, Raymond D.; The Economics of Wagering Markets; Journal of Economic Literature, vol. 36, No. 4; pp. 2021-2064, Dec. 1998.
Savage, Sam L.; Prices, Probabilities and Predictions; ORIMS Today; Jun. 2004 (10 pages).
Notification of Transmittal of the International Search Report and the Written Opinion of the International Searching Authority or the Declaration, for International Application No. PCT/US2005/15001, Sep. 13, 2007 (10 pages).
*Random Walk Theory*; http://www.streetauthority.com/terms/r/random-walk-theory.asp; 3 pages.
*Fixed Odds Financial Betting*; http://web.archive.org/web/20020329110541/http://betonmarkets.com/; 2 pages, May 10, 2005.
*United States Patent and Trademark Office; Notice of Allowance and Fee(S) Due* for U.S. Appl. No. 10/654,280, filed Sep. 3, 2003 in the name of Joseph M. Asher; 9 pages, Jan. 25, 2007.
*United States Patent and Trademark Office; Office Action* for U.S. Appl. No. 11/536,094, field Sep. 28, 2006 in the name of Lee M. Amaitis; 24 pages, Oct. 25, 2007.
*United States Patent and Trademark Office; Office Action* for U.S. Appl. No. 11/535,662, filed Sep. 27, 2006 in the name of Lee M. Amaitis; 12 pages, Nov. 1, 2007.
*United States Patent and Trademark Office; Office Action* for U.S. Appl. No. 10/795,163, filed Mar. 5, 2004 in the name of Christopher John Davie; 11 pages, Mar. 13, 2008.
*United States Patent and Trademark Office; Office Action* for U.S. Appl. No. 10/836,077, filed Apr. 29, 2004 in the name of Lee M. Amaitis; 11 pages, Mar. 14, 2008.
*United States Patent and Trademark Office; Office Action* for U.S. Appl. No. 11/745,573, filed May 8, 2007 in the name of Joseph M. Asher; 8 pages, Apr. 10, 2008.
*United States Patent and Trademark Office; Office Action* for U.S. Appl. No. 11/018,978, filed Dec. 21, 2004 in the name of Lee M. Amaitis; 6 pages, May 14, 2008.
*Australian Examiner's Report* for Application No. 2004227808; 2 pages, May 16, 2008.
*United States Patent and Trademark Office; Office Action* for U.S. Appl. No. 10/794,666, filed Mar. 5, 2004 in the name of Christopher John Davie; 11 pages, May 28, 2008.
*Notification of Transmittal of the International Search Report and the Written Opinion of the International Searching Authority* for International Application No. PCT/US05/15129; 8 pages, May 28, 2008.
*United States Patent and Trademark Office; Advisory Action* for U.S. Appl. No. 10/836,077, filed Apr. 29, 2004 in the name of Lee M. Amaitis; 2 pages, Jun. 3, 2008.
USPTO Notice of Allowance for U.S. Appl. No. 10/836,975, filed Jul. 1, 2009 (18 pages).
USPTO Notice of Allowance for U.S. Appl. No. 11/018,978, filed May 26, 2009 (7 pages).
United States Patent and Trademark Office; Office Action for U.S. Appl. No. 10/795,163, filed Mar. 5, 2004 in the name of Christopher John Davie; 11 pages; Date: Mar. 13, 2008.
United States Patent and Trademark Office; Office Action for U.S. Appl. No. 11/745,573, filed May 8, 2007 in the name of Joiseph M. Asher; 8 pages; Date: Apr. 10, 2008.
Australian Examiner's Report for Application 2004227808; 2 pages; Date: May 16, 2008.
United States Patent and Trademark Office; Office Action for U.S. Appl. No. 10/794,666, filed Mar. 5, 2004 in the name of Christopher John Davie; 11 pages; Date: May 28, 2008.
Notification of Transmittal of the International Search Report and the Written Opinion of the International Searching Authority for International Application No. PCT/US05/15129; 8 pages; Date: May 28, 2008.
United States Patent and Trademark Office; Advisory Action for U.S. Appl. No. 10/836,077, filed Apr. 29, 2004 in the name of Lee M. Amaitis; 2 pages; Date: Jun. 3, 2008.
United States Patent and Trademark Office; Office Action for U.S. Appl. No. 11/018,978, filed Dec. 21, 2004 in the name of Lee M. Amaitis; 6 pages; Date: May 14, 2008.
United States Patent and Trademark Office; Office Action for U.S. Appl. No. 10/836,077, filed Apr. 29, 2004 in the name of Lee M. Amaitis; 11 pages; Date: Mar. 14, 2008.
USPTO Office Action for U.S. Appl. No. 10/836,077, filed Oct. 28, 2008 (11 pages).
U.S. Patent Office Action for U.S. Appl. No. 10/836,975, filed Apr. 29, 2004 in the name of Joseph Asher; 26 pages, Aug. 31, 2007.
U.S. Patent Office Action for U.S. Appl. No. 11/623,901, filed Jan. 17, 2007 in the name of Joseph Asher; 14 pages, Mar. 12, 2008.
U.S. Patent Office Action for U.S. Appl. No. 11/623,908, filed Jan. 17, 2007 in the name of Joseph Asher; 14 pages, Feb. 4, 2008.
U.S. Patent Office Action for U.S. Appl. No. 11/623,933, filed Jan. 17, 2007 in the name of Joseph Asher; 9 pages, Apr. 29, 2008.
U.S. Patent Office Action for U.S. Appl. No. 11/623,943, filed Jan. 17, 2007 in the name of Joseph Asher; 16 pages, Mar. 17, 2008.
U.S. Patent Office Action for U.S. Appl. No. 10/836,975, filed Apr. 29, 2004 in the name of Joseph Asher; 29 pages, Feb. 9, 2007.
Marshall Fey, "Slot Machines, A Pictorial History of the First 100 Years", Fifth Edition, Liberty Belle Books, 1983, pp. 59-60 & 168.
Notification of Transmittal of the International Search Report and the Written Opinion of the International Searching Authority, or the Declaration for International Application No. PCT/US05/14667; 11 pages; Date: Mar. 30, 2007.
Notification of Transmittal of the International Search Report and Written Opinion for International Application No. PCT/US05/15004, 6 pages; Date: Jun. 14, 2006.
USPTO Office Action for U.S. Appl. No. 10/836,958, filed Mar. 7, 2008 (16 pages).
USPTO Office Action for Application No. 11/623,901, filed Dec. 24, 2008 (14 pages).
USPTO Office Action for Application No. 11/623,943, filed Jan. 6, 2009 (27 pages).
USPTO Office Action for Application No. 10/836,975, filed Nov. 20, 2008 (25 pages).
Notice of Allowance for U.S. Appl. No. 10/836,958, filed Oct. 6, 2008 (6 pages).

* cited by examiner

SYSTEM AND METHOD FOR WAGERING BASED ON FINANCIAL MARKET INDICATORS

This application is a divisional of U.S. patent application Ser. No. 10/836,077, filed Apr. 29, 2004, the contents of which is incorporated by reference herein.

TECHNICAL FIELD OF THE INVENTION

This invention relates in general to gaming systems and methods and, more particularly, to systems and methods for wagering based on financial market indicators.

BACKGROUND OF THE INVENTION

The rules to playing slot machines are quite simple. A player deposits money and spins the reels. In a physical casino, the player spins the reels by either pushing a button or yanking on a lever. In an online casino, the player uses a mouse or any suitable computer key to click on the button or lever. A slot machine has one or more horizontal lines, or paylines, across the window of the slot machine. If a certain combination of symbols falls on a horizontal line when the reels stop, the player is a winner. Payouts vary by machine, and by the number of lines the player chooses to play.

In prior slot machines, the combination of symbols that line up on the reels of a slot machine are determined by a Random Number Generator. This is a computer program inside the machine that is used to generate a sequence of numbers in milliseconds. Each random number it generates corresponds to a reel combination. Even when a slot machine is not being used, the RNG keeps doing its job of generating numbers. Whatever random number was generated the split second the player pulled the handle (or hit the “bet one” or “max bet” button) will result in the corresponding reel combinations that appear on the screen. The RNG doesn’t care how much was bet, whether the player pulled the handle or hit the spin button, whether it’s the player’s first play or last, whether the player is winning or losing, or whether the player is playing with or without a slot card. It just continually generates random numbers. If the player happens to be the lucky player that plays the very split second the RNG generated a number corresponding to a jackpot reel combination, the player will be a winner.

SUMMARY OF THE INVENTION

In one embodiment, a wagering system is provided. The wagering system comprises a client coupled to a controller. The client communicates a bet regarding a spin of the reels of a slot machine. The controller determines a first value for a first reel of the slot machine based at least in part upon the value of a digit of a first financial market indicator. The controller continues to determine a second value for a second reel of the slot machine, and a third value for a third reel of the slot machine. The controller then determines the outcome of the bet based at least in part upon the first value, the second value, and the third value.

In another embodiment, a method for wagering is provided. The method starts by receiving a bet indicating the value of a multi-digit number. The method continues by determining a first value based at least in part upon the value of a digit of a first financial market indicator, and by determining a second value based at least in part upon the value of a digit of a second financial market indicator. The method proceeds by determining a winning number based at least in part upon the first value and the second value. The method concludes by comparing the winning number against the value of the multi-digit number indicated by the bet, and by determining an outcome of the bet based at least in part upon the comparison.

Various embodiments of the present invention may benefit from numerous advantages. It should be noted that one or more embodiments may benefit from some, none, or all of the advantages discussed below. One advantage is that systems and methods provide bettors with gaming based upon the value of financial market indicators. Thus, a bettor may place a bet, such as a bet regarding the spin of the reels of a slot machine, in which the inputs for the game are determined based on the value of financial market indicators rather than the numbers generated by a Random Number Generator. Another advantage is that when financial market indicators are unavailable, such as on the weekends and holidays when financial markets are typically closed, the system determines inputs for the game based on some other type of non-random but unpredictable event.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1:
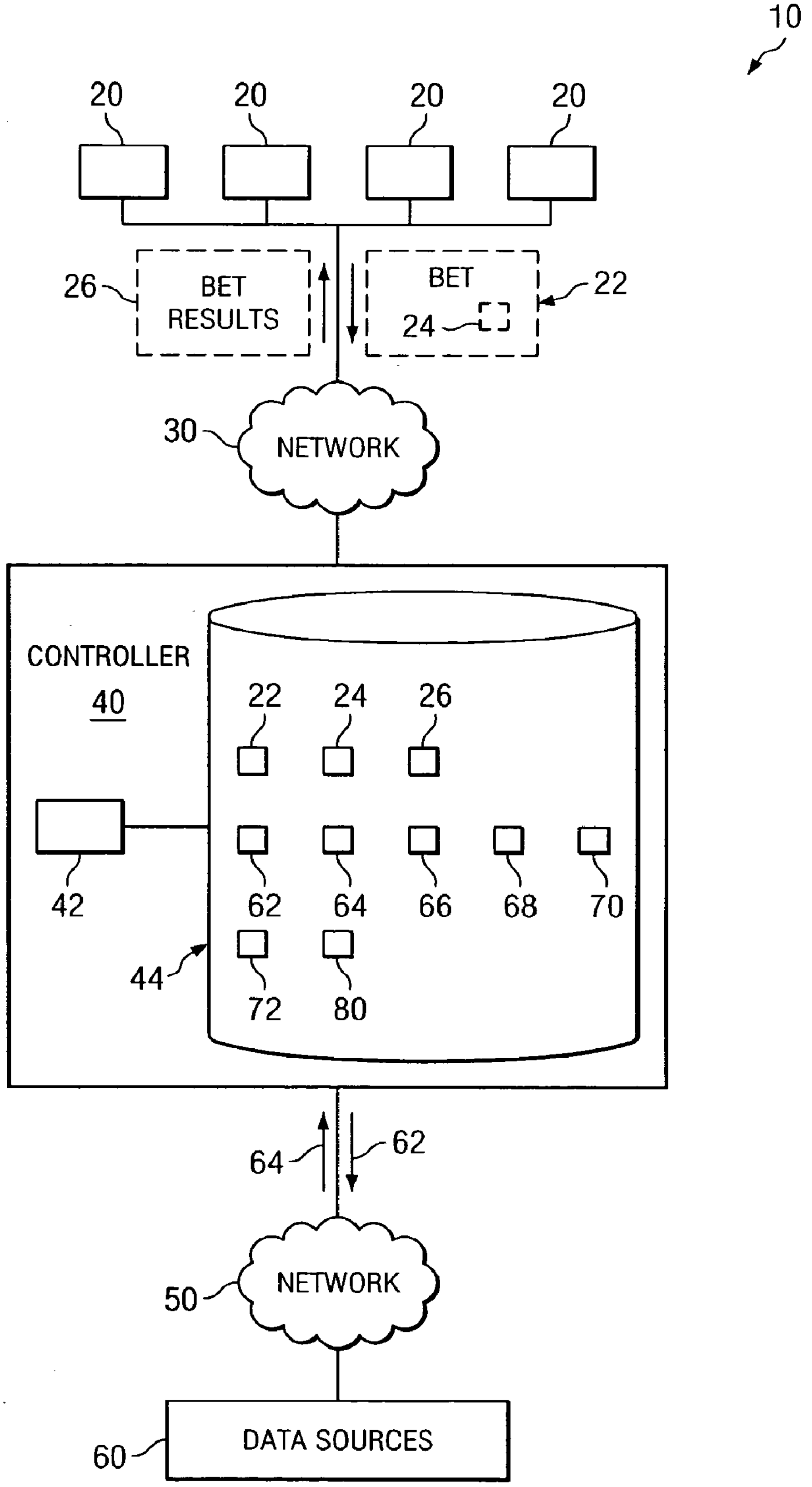
FIG. 1 illustrates an example system for wagering based on financial market indicators in accordance with an embodiment of the present invention.

FIG. 1 illustrates one embodiment of a system 10 that includes clients 20 coupled to a controller 40 using communication network 30. Controller 40 is further coupled to one or more data sources 60 using communication network 50. In general, system 10 provides for wagering based at least in part upon event information 64, such as financial market indicators.

Figure 2:
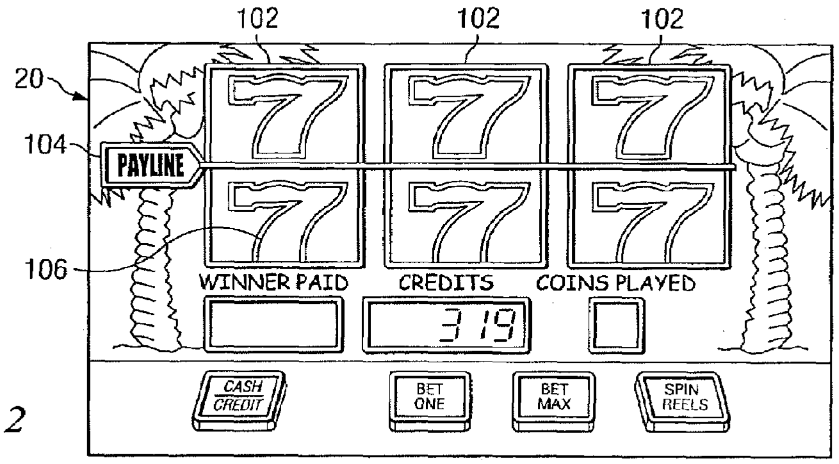
FIG. 2 illustrates one embodiment of a slot machine used with the system of FIG. 1.

Clients 20 are various users of system 10 that may place a bet 22 comprising bet parameters 24 and receive bet results 26. Clients 20 may also refer to the devices used by various users of system 10. Examples of these devices include a computer, a personal digital assistant, a mobile phone, a kiosk or point of sale terminal, or any other device that can interoperate with the elements of system 10 to perform the functions described herein. In a particular embodiment, clients 20 comprise physical slot machines. In other embodiments, clients 20 comprise devices, such as those described above, that can display a virtual slot machine to a user. FIG. 2 illustrates one example of such a slot machine 20.

Referring to FIG. 2, a slot machine 20, whether physical or virtual, includes any suitable number of reels 102, paylines 104, and symbols 106. Each reel 102 comprises a cylindrical spinning piece, or virtual display thereof, around which the symbols 106 are displayed. Each payline 104 comprises a line (e.g., horizontal, vertical, diagonal, or other) in the visible playing section of the slot machine 20. Each symbol 106 comprises a graphic, picture, image, or icon that is displayed on a reel 102. The symbols 106 may comprise, for example, blanks, cherries, bananas, oranges, diamonds, bells, lemons, numbers, bars, double bars, or any other recognizable images.

The more reels 102 that are associated with the slot machine 20, the more permutations or possible combinations of symbols 106 are able to appear on the one or more paylines 104. The slot machine 20 illustrated in FIG. 2 is only one type of slot machine 20. The look and feel of slot machine 20 could change based on any number of factors associated with system 10, such as the type of data that is used to create the inputs for the slot machine 20. For example, if financial information 64 is used, then the look and of slot machine 20 feel (e.g., symbols 106, buttons, display, etc.) may be customized for financial markets.

Referring back to FIG. 1, communication networks 30 and 50 may comprise any suitable number and combination of local area networks, wide area networks (e.g., the Internet), wireless networks, or any other type of network that transfers data between controller 40 and the other elements of system 10, such as clients 20 and data sources 60. Although illustrated as two separate networks, all or a portion of networks 30 and 50 may be common to one another. Moreover, all or a portion of communication networks 30 and 50 may be a proprietary network. The transfer of data on network 30 may include the transfer of bets 22 and bet results 26. The transfer of data on network 50 may include a transfer of event data requests 62, such as financial market requests 62, and event information 64, such as financial market information 64.

Controller 40 comprises a processor 42 coupled to a memory 44. Processor 42 may comprise any suitable processor, such as a central processing unit (CPU) or other microprocessor, and may include any suitable number of processors working together. Memory 1 may comprise any suitable combination of volatile and non-volatile memory that stores bets 22, bet parameters 24, bet results 26, event data requests 62, event information 64, gaming rules 66, input values 68, input symbols 70, payouts 72, and wagering system software application 80. Processor 42 executes application 80 to process bets 22 based at least in part upon event information 64. Although the description detailed below discusses the controller 40 performing particular functions, it should be understood that some or all of the functions described as being performed by the controller 40 may be performed by clients 20.

Data sources 60 comprise any suitable source of real-time or substantially real-time event information 64. For example, data sources 60 may comprise a source of financial market information 64, such as market centers, market data vendors, news services, and the like. Financial market information 64 comprises information regarding the value of a financial market index or any other suitable financial instrument (e.g., stocks, bonds, futures contracts), referred to generally as a financial market indicator, during or at the end of a predetermined period of time or after one or more relevant transactions. For example, a financial market indicator may comprise the value of a certain financial market index, foreign or domestic, such as the Dow Jones Industrial Average (DJIA), the NASDAQ, the Financial Times Stock Exchange (FTSE), the S&P 500, the New York Stock Exchange, or any other suitable financial market index. In another example, the financial market indicator may comprise the value of a particular stock, bond, futures contract, or any other suitable financial instrument. The financial market indicator may be rounded, such as to the nearest whole point (e.g., a financial market indicator of 9,314.62 may be rounded up to 9,315), and/or include any suitable number of decimal places to provide an appropriate level of granularity. Therefore, each financial market indicator may comprise a plurality of numerical digits associated with the value of a corresponding financial market index or other financial instrument. As described in greater detail below, controller 40 may determine the outcome of bets 22 based at least in part upon the value of one or more digits that comprise a particular financial market indicator.

Although the description of system 10 is detailed with reference to financial markets, it should be understood that system 10 provides for the contingency whereby financial markets (and therefore financial market indicators) are unavailable at a given point in time. For example, financial markets may be closed at various times of the day, on weekends, or during holidays so that financial market indicators are unavailable at these times. In those instances, controller 40 uses event information 64 from other sources 60 to create inputs for the games, such as a slot machine game. The event information 64 may comprise any suitable numerical data that is not randomly generated but that is also not predictable. For example, the event information 64 may be related to the weather in one or more locations at a particular time; the U.S. national debt at a particular time; power consumption of a city at a particular time; the number of television shows tuned in to a particular channel or program at a particular time (e.g., television ratings); the power output of a facility at a particular time; horse race, dog race, jai alai, or other sporting event results at a particular time; or any other substantially changing numerical data that is related to non-random events.

In operation, controller 40 receives a bet 22 comprising bet parameters 24. In one embodiment, the bet 22 comprises a bet regarding a spin of the reels 102 of a slot machine 20. In another embodiment, the bet 22 comprises a bet regarding a "lottery" number. The bet parameters 24 comprise one or more of the identity of the client 20 that originated the bet 22; the amount of the bet 22; the time the bet 22 was placed; the type of bet 22 (e.g., slot machine bet, lottery bet, or other type bet); a period of time used to determine the appropriate financial market information 64; a particular digit of a financial market indicator (e.g., first digit, last digit, nth digit); and information that identifies one or more financial instruments used to determine the appropriate financial market information 64. In the embodiment where the type of bet 22 comprises a lottery bet 22, the bet parameters 24 may further include a multi-digit lottery number.

Controller 40 processes the bet 22 based at least in part upon financial market information 64. For example, suppose bet 22 specifies the DJIA, the S&P 500, and the NASDAQ, as financial market indices to be used to determine the outcome of bet 22. Suppose further that bet 22 specifies that the financial market indicators for these financial market indices should be captured ten seconds after the bet 22 is placed, as represented, for example, by a timestamp associated with bet 22 (other bets 22 could indicate that the financial market indicator that is used coincide in time with the timestamp communicated with the bet 22). In this example, controller 40 generates a financial market request 62 for the appropriate financial market information 64. In response to the financial market request 62, controller 40 receives the following financial market indicators representing the value of the DJIA, the S&P 500, and the NASDAQ ten seconds after the bet 22 was placed: DJIA—10,155; S&P 500—1112; and NASDAQ—1959. Suppose further that the bet parameters 24 of the bet 22 specified the use of the last digit of each of these financial market indicators to determine input values 68. Controller 40 therefore determines a first input value 68 of "5" (e.g., the last digit of the financial market indicator associated with the DJIA); a second input value 68 of "2" (e.g., the last digit of the financial market indicator associated with the S&P 500); and a third input value 68 of "9" (e.g., the last digit of the financial market indicator associated with the NASDAQ).

In other examples, the input values 68 may be determined based on other digits of a financial market indicator or by applying any suitable mathematical formula that uses one or more digits of one or more financial market indicators as operands. In still other examples, a second input value 68 may be based at least in part upon a second digit of a first financial market indicator (e.g., first input value 68 is the $n^{th}$ digit of DJIA and second input value 68 is the $m^{th}$ digit of DJIA).

Controller 40 determines the outcome of bet 22 based upon the first input value 68, the second input value 68, and the third input value 68. For example, suppose that bet 22 comprises a slot machine type bet 22. In this example, controller 40 maps the input values 68 to appropriate input symbols 70 for a slot machine 20, according to rules 66. In particular, controller 40 maps the first input value 68 to a first input symbol 70 for a first reel 102 of slot machine 20. Controller 40 maps the second input value 68 to a second input symbol 70 for a second reel 102 of slot machine 20. Controller 40 maps the third input value 68 to a third input symbol 70 for a third reel 102 of slot machine 20. The first reel 102, the second reel 102, and the third reel 102 may be arranged in any suitable order in the slot machine 20, so that the ordering of the financial market indicators when applied to the reels 102 of the slot machine 20 may comprise one of "529," "592," "259," "295," "952," or "925" based upon rules 66 or bet parameters 24.

Rules 66 specify a mapping of numeric digits to particular input symbols 70. For example, rules 66 may specify the following mapping:

"0"=Blank
"1"=Cherry
"2"=Banana
"3"=Orange
"4"=Diamond
"5"=Bell
"6"=Lemon
"7"=Seven
"8"=Bar
"9"=Double Bar Of course, controller 40 may use any suitable mapping of numeric digits to input symbols 70, and the mapping provided above is only an example of one such mapping. Moreover, particular embodiments of system 10 use bonus symbols 70 to create a jackpot. For example, from time to time, any of the numeric digits from "0" to "9" could result in a bonus symbol 70, such as a "$," "+," "#," "£," "¥," etc. If one or more of the reels 102 results in a bonus symbol 70, then the user wins an enhanced payout 72. For example, if one reel 102 results in a bonus symbol 70, the user may win a higher payout 72 than normal. If two reels 102 result in a bonus symbol 70, the user may win a still higher payout 72. If all three reels 102 result in a bonus symbol 70, the user may win a jackpot payout 72. The occurrence of a bonus symbol 70 for any given reel 102 could be based upon predetermined odds. For example, the odds of receiving a bonus symbol 70 for any given reel 102 may be 100-1. The odds of receiving a bonus symbol 70 for two reels 102 would therefore be 1000-1. The odd of receiving a bonus symbol 70 for all three reels 102 would therefore be 1,000,000-1. The payouts 72 for each of these results could then be predicated upon the predetermined odds, taking into account a predetermined house advantage.

Using the mapping set forth above, controller 40 therefore determines that the spin of the reels 102 of slot machine 20 associated with bet 22 resulted in a combination of "Bell," "Banana," and "Double Bar" at the payline 104. Controller 40 applies rules 66 to determine bet results 26. That is, controller 40 applies rules 66 to determine whether this combination of symbols 70 results in a "win," a "loss," or a "tie". Controller 40 also applies rules 66 to determine a payout 72 based upon the resulting combination of symbols 70 and the amount of the bet 22. In this regard, rules 66 include the winning combinations of symbols 70, the payout odds associated therewith, and any other factors used to determine a bet result 26 and/or a payout 72. Controller 40 communicates bet results 26 and any other data used to display the appropriate symbols 70 on the reels 102 of slot machine 20.

Controller 40 may also determine the outcome of bet 22 based upon the first input value 68, the second input value 68, and third input value 68 if bet 22 comprises a lottery type bet 22. In this example, suppose the bet parameters 24 specified a multi-digit lottery number of "529" and specified that this number was to be formed using the last digit of the DJIA, S&P 500, and NASDAQ, in that order, ten seconds after the bet 22 was placed. Based upon the financial market indicators described above, controller 40 determines a winning number of "529." In other examples, the winning number may be determined by applying any suitable mathematical formula that uses one or more determined input values 68 (or financial market indicators) as the operands.

Controller 40 compares the multi-digit lottery number of "529" specified by the bet parameters 24 with the winning number "529" determined according to financial market information 64 to determine the outcome of lottery type bet 22. In this example, controller 40 determines that bet 22 "wins." Controller 40 determines an appropriate payout 72 for the winning bet 22 based at least in part upon the amount of the bet 22 and/or the payout odds associated with such a bet 22 as specified by rules 66. For example, with respect to a three-digit lottery type bet 22, rules 66 may specify payout odds of 500-1. Therefore, if the amount of the bet 22 was $1, then the payout 72 would comprise $500.00.

Figure 3:
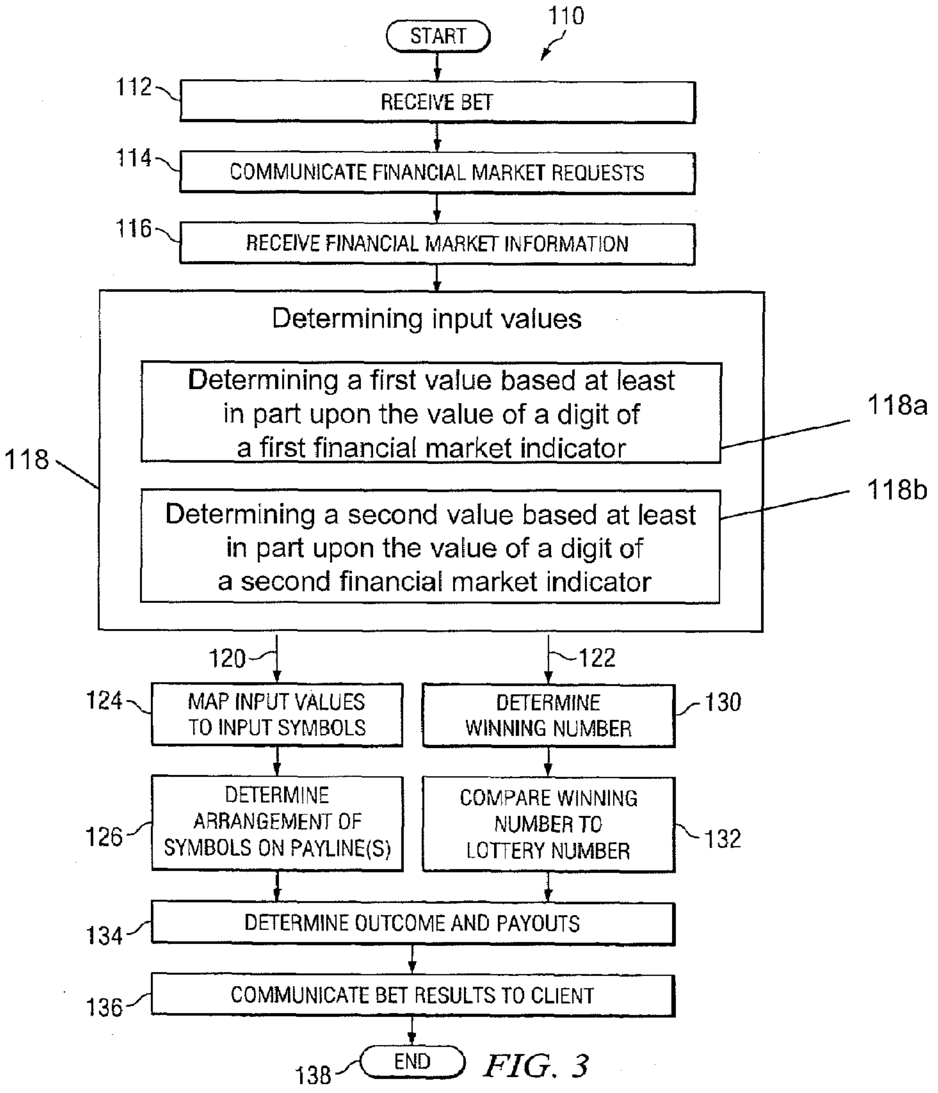
FIG. 3 illustrates a flowchart depicting one example method for wagering based on financial market indicators.

FIG. 3 illustrates a flowchart 110 depicting one example method for wagering based on financial market indicators. At step 112, controller 40 receives a bet 22 from a client 20. The bet 22 may specify particular financial instruments and a predetermined period of time to be used to determine one or more financial market indicators. For example, the bet 22 may specify to capture financial market indicators for the DJIA, the S&P 500, and the NASDAQ ten seconds after the bet 22 is placed. Bet 22 may further specify additional bet parameters 24. Controller 40 communicates appropriate financial market requests 62 at step 114 and receives appropriate financial market information 64 at step 116. In other embodiments, controller 40 may simply capture the appropriate financial market information 64 without issuing any requests 62. In still other embodiments when financial market indicators are unavailable, controller 40 captures other event information 64 for use in later steps of the method.

Execution proceeds to step 118 where controller 40 determines the input values 68 based upon the financial market information 64 received at step 116. Controller 40 may determine any suitable number of input values 68 from any suitable number and combination of financial market indicators using any suitable techniques described in greater detail above with regard to FIG. 1. From here, execution proceeds along path 120 if the bet 22 is a slot machine type bet 22, and along path 122 if the bet 22 is a lottery type bet 22.

Proceeding along path 120, controller 40 maps input values 68 determined at step 118 to input symbols 70 at step 124. Controller 40 determines the arrangement of input symbols 70 on the one or more paylines 104 of the slot machine 20 at step 126. This arrangement may be based at least in part upon bet parameters 24. For example, the bet parameters 24 may dictate that the financial market indicators for the DJIA, the S&P 500, and the NASDAQ should be used in that specific order.

Proceeding along path 122, controller 40 determines the winning number, at step 130, based at least in part upon the input values 68 determined at step 118. Controller 40 compares the winning number determined at step 130 to the lottery number specified by the bet 22, at step 132.

Whether execution proceeded along path 120 or path 122, execution now proceeds to step 134 where controller 40 determines one or more outcomes of the bet 22 and payouts 72. Controller 40 communicates bet results 136 to client 20 at step 136. Execution terminates at step 138.

It should be understood that in alternative embodiments, the present invention contemplates using methods with additional steps, fewer steps, different steps, or steps in different sequential order so long as the steps remain appropriate for wagering based on financial market indicators.

Although embodiments of the invention and their advantages are described in detail, a person skilled in the art could make various alterations, additions, and omissions without departing from the spirit and scope of the present invention as defined by the appended claims.

What is claimed is:

1. A machine-implemented method for wagering, comprising:

determining a period of time:

after determining the period of time, receiving a bet indicating the value of a multi-digit number, the bet being associated with a time;

determining a first value based at least in part upon the value of a digit of a first financial market indicator, in which the value of the digit includes a value of the digit that occurs at the moment when the period of time has passed after the time associated with the bet;

determining a second value based at least in part upon the value of a digit of a second financial market indicator;

determining a winning number based at least in part upon the first value and the second value;

comparing, by a processor, the winning number against the value of the multi-digit number indicated by the bet;

determining, by the processor, an outcome of the bet based at least in part upon the comparison; and providing, by the processor, information identifying the outcome.

2. The method of claim 1, further comprising determining a third value based at least in part upon the value of a third financial market indicator, wherein determining the winning number is further based upon the third value.

3. The method of claim 1, wherein the first value and the second value are arranged in an order to determine the winning number, and the order is indicated by the bet.

4. The method of claim 1, wherein the first financial market indicator comprises a plurality of numerical digits, and the first value is based at least in part upon the value of the last digit of the plurality of digits.

5. The method of claim 1, wherein the first financial market indicator comprises a plurality of numerical digits, and the first value is based at least in part upon a formula using at least one of the plurality of digits.

6. The method of claim 1, wherein the first financial market indicator comprises a plurality of numerical digits, and the first value is based at least in part upon the value of at least one particular digit of the plurality of digits, the particular digit identified by the bet.

7. The method of claim 1, wherein the first financial market indicator is associated with at least one of: an index of financial instruments, an index of stocks, an index of U.S. securities, an Index of international securities, an index of financial instruments related to companies that have a large capitalization, and an index of financial instruments that relate to technology companies.

8. The method of claim 1, wherein the time includes a time when the bet is placed, and the period of time includes a a period of time after the bet is placed.

9. The method of claim 8, wherein the bet identifies the time.

10. The method of claim 1, wherein the bet identifies a source of the first financial market indicator.

11. The method of claim 1, further comprising determining a payout for the bet based at least in part upon the outcome of the bet.

12. The method of claim 11, wherein the bet is associated with a bet amount and determining a payout is further based upon the bet amount.

13. The method of claim 1, wherein the second value is based at least in part upon the value of a digit of a second financial market indicator.

14. The method of claim 1, further comprising:

mapping the first value to a symbol for a first reel of a slot machine;

mapping the second value to a symbol for a second reel of a slot machine; and determining another outcome of the bet based at least in part upon the symbols of the first reel and the second reel of the slot machine.

15. The method of claim 14, wherein the first reel and the second reel are arranged in any order in the slot machine.

16. The method of claim 14, wherein the slot machine comprises a physical slot machine.

17. The method of claim 14, wherein the slot machine comprises a virtual slot machine.

18. The method of claim 1, wherein the time includes a time when the bet is received, and the period of time includes a period of time after the bet is received.

19. The method of claim 1, wherein the indication of the bet identifies the period of time.

20. The method of claim 1, in which the time period is 10 seconds.

* * * * *